US011893081B2

(12) United States Patent
Qu et al.

(10) Patent No.: US 11,893,081 B2
(45) Date of Patent: Feb. 6, 2024

(54) MAP DISPLAY METHOD AND APPARATUS

(71) Applicant: Beijing Baidu Netcom Science Technology Co., Ltd., Beijing (CN)

(72) Inventors: Da Qu, Beijing (CN); Wenjie Ma, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 344 days.

(21) Appl. No.: 17/485,776

(22) Filed: Sep. 27, 2021

(65) Prior Publication Data
US 2022/0012529 A1 Jan. 13, 2022

(30) Foreign Application Priority Data
Dec. 24, 2020 (CN) .......................... 202011549038.6

(51) Int. Cl.
*G06V 10/00* (2022.01)
*G06F 18/2137* (2023.01)
(Continued)

(52) U.S. Cl.
CPC ...... *G06F 18/21375* (2023.01); *G06T 15/205* (2013.01); *G06V 10/48* (2022.01)

(58) Field of Classification Search
CPC ...... G06K 9/6252; G06K 9/4633; G06T 7/10; G06T 7/11; G06T 7/162; G06T 7/174;
(Continued)

(56) References Cited

U.S. PATENT DOCUMENTS

| 4,835,532 A * | 5/1989 | Fant ................... G09B 9/301 345/611 |
| 5,742,924 A * | 4/1998 | Nakayama ......... G01C 21/3635 340/995.14 |

(Continued)

FOREIGN PATENT DOCUMENTS

| CN | 103971399 A | 8/2014 |
| CN | 106296783 A | 1/2017 |

(Continued)

OTHER PUBLICATIONS

Lijing, L. (2013). Realization of 360° Panoramic Roaming Animation Based on Static Images. Journal of Pingxiang College, 30(06).
(Continued)

*Primary Examiner* — Amir Alavi
(74) *Attorney, Agent, or Firm* — Harness, Dickey & Pierce, P.L.C.

(57) ABSTRACT

This application discloses a map display method and apparatus, where the method includes: obtaining an initial image, where a first road is included in the initial image. The initial image is divided into a first sub-image and a second sub-image, where the first road is not included in the first sub-image, and the first road is included in the second sub-image. The first sub-image is mapped to a first plane of a transition model, and the second sub-image is mapped to a second plane of the transition model, where there is an included angle between the first plane and the second plane, and the first plane is parallel to a screen of a display device. The second plane is controlled to move by means of the transition model, until the included angle is reduced from a first angle to a second angle, and a three-dimensional map display animation is obtained.

20 Claims, 11 Drawing Sheets

(51) Int. Cl.
*G06V 10/48* (2022.01)
*G06T 15/20* (2011.01)

(58) Field of Classification Search
CPC ......... G06T 13/20; G06T 15/04; G06T 15/20;
G06T 15/205; G06T 17/05; G06V 10/48;
G06F 18/21375
See application file for complete search history.

(56) References Cited

U.S. PATENT DOCUMENTS

| | | | | |
|---|---|---|---|---|
| 5,793,310 | A * | 8/1998 | Watanabe | G01C 21/3635 340/995.14 |
| 6,058,350 | A * | 5/2000 | Ihara | G01C 21/387 701/93 |
| 7,711,473 | B2 * | 5/2010 | Sekine | G01C 21/3859 701/450 |
| 8,239,355 | B2 * | 8/2012 | Sekine | G01C 21/387 707/695 |
| 11,105,652 | B2 * | 8/2021 | Yunoki | G01C 21/14 |
| 2006/0132482 | A1 | 6/2006 | Oh | |
| 2012/0299920 | A1 | 11/2012 | Coombe et al. | |
| 2013/0321400 | A1 * | 12/2013 | van Os | G06F 16/2291 345/419 |
| 2013/0328883 | A1 * | 12/2013 | Sethia | G06T 7/0004 345/441 |
| 2021/0012527 | A1 * | 1/2021 | Shu | G06N 3/045 |
| 2021/0389157 | A1 * | 12/2021 | Igarashi | G01C 21/3815 |
| 2022/0012529 | A1 * | 1/2022 | Qu | G06T 17/05 |

FOREIGN PATENT DOCUMENTS

| | | |
|---|---|---|
| CN | 106484850 A | 3/2017 |
| CN | 108564647 A | 9/2018 |
| CN | 111882642 A | 11/2020 |
| WO | 2018153196 A1 | 8/2018 |
| WO | 2020103040 A1 | 5/2020 |

OTHER PUBLICATIONS

Notice of Registration dated Jun. 12, 2023, in corresponding Chinese Application No. 202011549038.6.

* cited by examiner

MAP DISPLAY METHOD AND APPARATUS

CROSS-REFERENCE TO RELATED APPLICATIONS

This application claims priority to Chinese Patent Application No. 202011549038.6, which was filed on Dec. 24, 2020 and titled "map display method and apparatus". The disclosure of the above patent application is incorporated herein by reference in its entirety.

TECHNICAL FIELD

The present application relates to the field of computer vision in the image processing technology, and in particular to a map display method and apparatus.

BACKGROUND

With continuous development of map-related technologies, currently a map can realize a panoramic display of a scene. In the process of panoramic display, shuttle and switch between scenes are usually involved.

At present, when implementing a panoramic display in the prior art, a panoramic picture is usually mapped into a spherical model, so as to perform a panoramic display as a view angle changes. When realizing a scene change, the currently mapped panoramic picture in the spherical model is directly replaced with a next panoramic picture that needs to be displayed, thereby reusing the spherical model to achieve the scene change.

However, directly replacing a panoramic picture in a spherical model to achieve a scene change will cause the performance of the change of the scene to be abrupt and lack vividness.

SUMMARY

The present application provides a map display method and apparatus, a device and a storage medium.

According to a first aspect of the present application, a map display method is provided, including:
obtaining an initial image, where a first road is included in the initial image;
dividing the initial image into a first sub-image and a second sub-image, where the first road is not included in the first sub-image, and the first road is included in the second sub-image;
mapping the first sub-image to a first plane of a transition model, and mapping the second sub-image to a second plane of the transition model, where there is an included angle between the first plane and the second plane, and the first plane is parallel to a screen of a display device; and
controlling the second plane to move by means of the transition model, until the included angle is reduced from a first angle to a second angle, and a three-dimensional map display animation is obtained.

According to a second aspect of the present application, a map display apparatus is provided, including:
an obtaining module, configured to obtain an initial image, where a first road is included in the initial image;
a dividing module, configured to divide the initial image into a first sub-image and a second sub-image, where the first road is not included in the first sub-image include, and the first road is included in the second sub-image;
a mapping module, configured to map the first sub-image to a first plane of a transition model, and map the second sub-image to a second plane of the transition model, where there is an included angle between the first plane and the second plane, and the first plane is parallel to a screen of a display device; and
a control module, configured to control the second plane to move by means of the transition model, until the included angle is reduced from a first angle to a second angle, and a three-dimensional map display animation is obtained.

According to a third aspect of the present application, an electronic device is provided, including:
at least one processer; and
a memory communicatively connected to the at least one processor; where
the memory stores instructions executable by the at least one processor, and the instructions are executed by the at least one processor, so that the at least one processor is capable of executing the method according to the first aspect.

According to a fourth aspect of the present application, a non-transitory computer-readable storage medium stored with computer instructions is provided, where the computer instructions are used to enable a computer to execute the method according to the first aspect.

According to a fifth aspect of the present application, a computer program product is provided, where the program product includes: a computer program stored in a readable storage medium, at least one processor of an electronic device can read the computer program from the storage medium, and the at least one processor executes the computer program to enable the electronic device to execute the method according to the first aspect.

According to the technology of the present application, the vividness of a scene change is effectively enhanced.

It should be understood that the content described in this section is not intended to identify key or important features of the embodiments of the present disclosure, nor is it intended to limit the scope of the present application. Other features of the present application will be easily understood through the following description.

BRIEF DESCRIPTION OF DRAWINGS

The drawings are used to better understand the solutions, and do not constitute a limitation to the present application, where.

DESCRIPTION OF EMBODIMENTS

Exemplary embodiments of the present application are described below with reference to the accompanying drawings, where various details of the embodiments of the present application are included to facilitate understanding, and should be considered as merely exemplary. Therefore, those of ordinary skill in the art should recognize that various changes and modifications can be made to the embodiments described herein without departing from the scope and spirit of the present application. Similarly, for clarity and conciseness, descriptions of well-known functions and structures are omitted in the following description.

Figure 1:
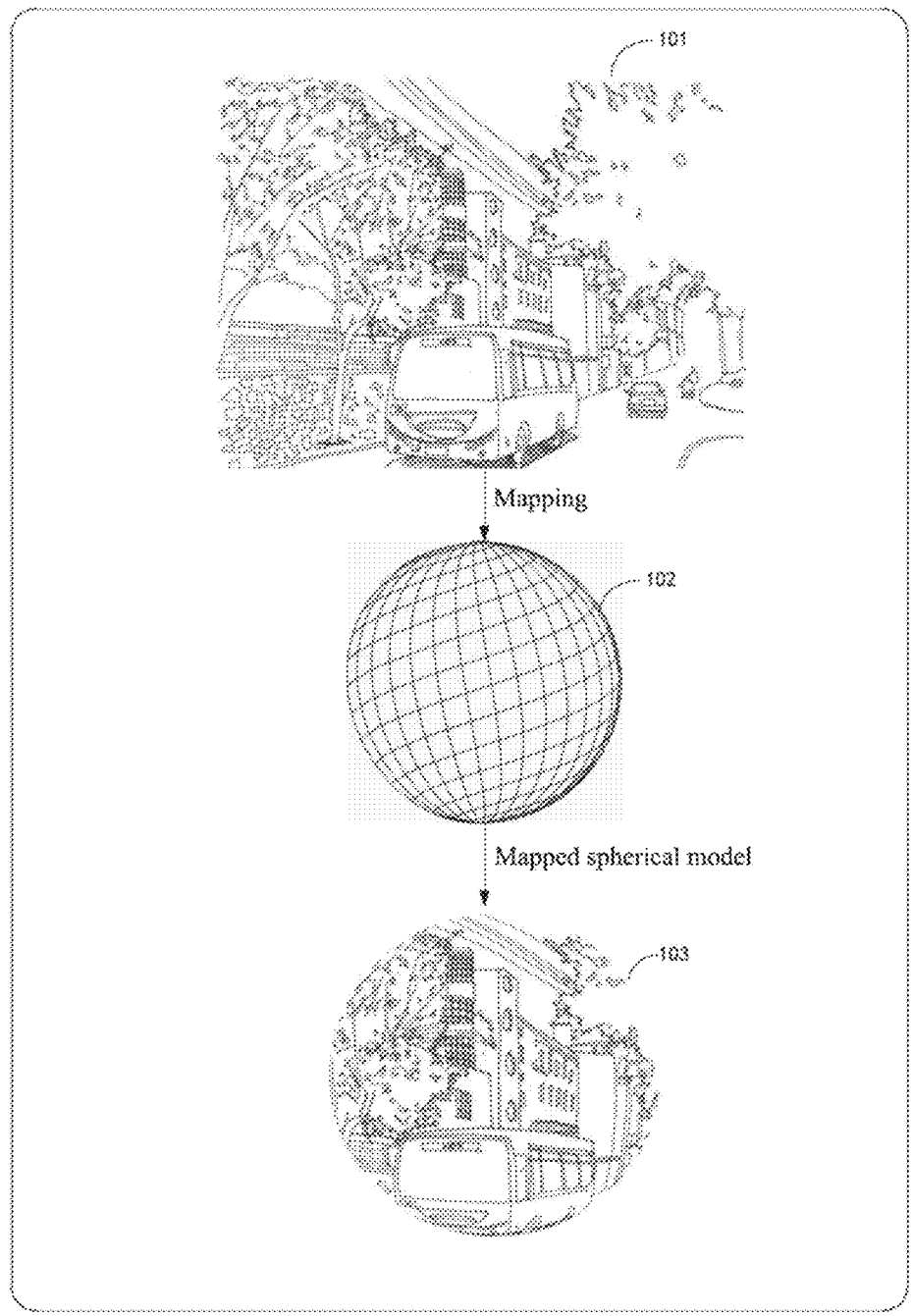
FIG. 1 is a schematic diagram of the implementation of displaying a panoramic picture based on a spherical model provided by an embodiment of the present application.

In order to better understand the technical solutions of the present application, the background technology involved in the present application will be first further introduced in detail with reference to FIG. 1. FIG. 1 is a schematic diagram of the implementation of displaying a panoramic picture based on a spherical model provided by an embodiment of the present application.

With continuous development of the map field, the panoramic display of scenes is supported in current maps, such as the panoramic function in some maps. In the panoramic display, a terminal device can rotate a corresponding view angle in response to a user's sliding operation on a screen, so as to display the scene corresponding to the user's rotating view angle on the screen. The panoramic display allows the user to obtain the surrounding environment information of a certain place based on the map, thereby the use scene of map can be effectively expanded.

At present, when a panoramic display is implemented, a 2D panoramic picture is usually mapped to a 3D spherical model, where the panoramic picture usually refers to the photographs taken with a normal and effective view angle in conformity with human eyes (approximately 90 degrees horizontally, 70 degrees vertically) or with a view angle more than that including the peripheral vision of eyes (approximately 180 degrees horizontally, 90 degrees vertically), or even in a range of 360-degree complete scenes.

Its implementation can be understood, for example, with reference to FIG. 1. As shown in FIG. 1, assuming that there is currently a panoramic picture 101, the panoramic picture may be collected by a collecting vehicle on a road, or may also be taken by a camera device. The panoramic picture can be a picture of any scene, and the specific implementation of the panoramic picture is not particularly limited in the present embodiment.

And, it is assumed that the spherical model 102 is currently determined, and the above-described panoramic picture 101 is mapped to the spherical model 102, so that the mapped spherical model 103 is obtained. Based on the mapped spherical model 103, the panoramic display of the panoramic picture can be achieved. As a user rotates a view angle, the spherical model also rotates accordingly, thereby a picture of different parts of the spherical model are displayed.

Figure 2:
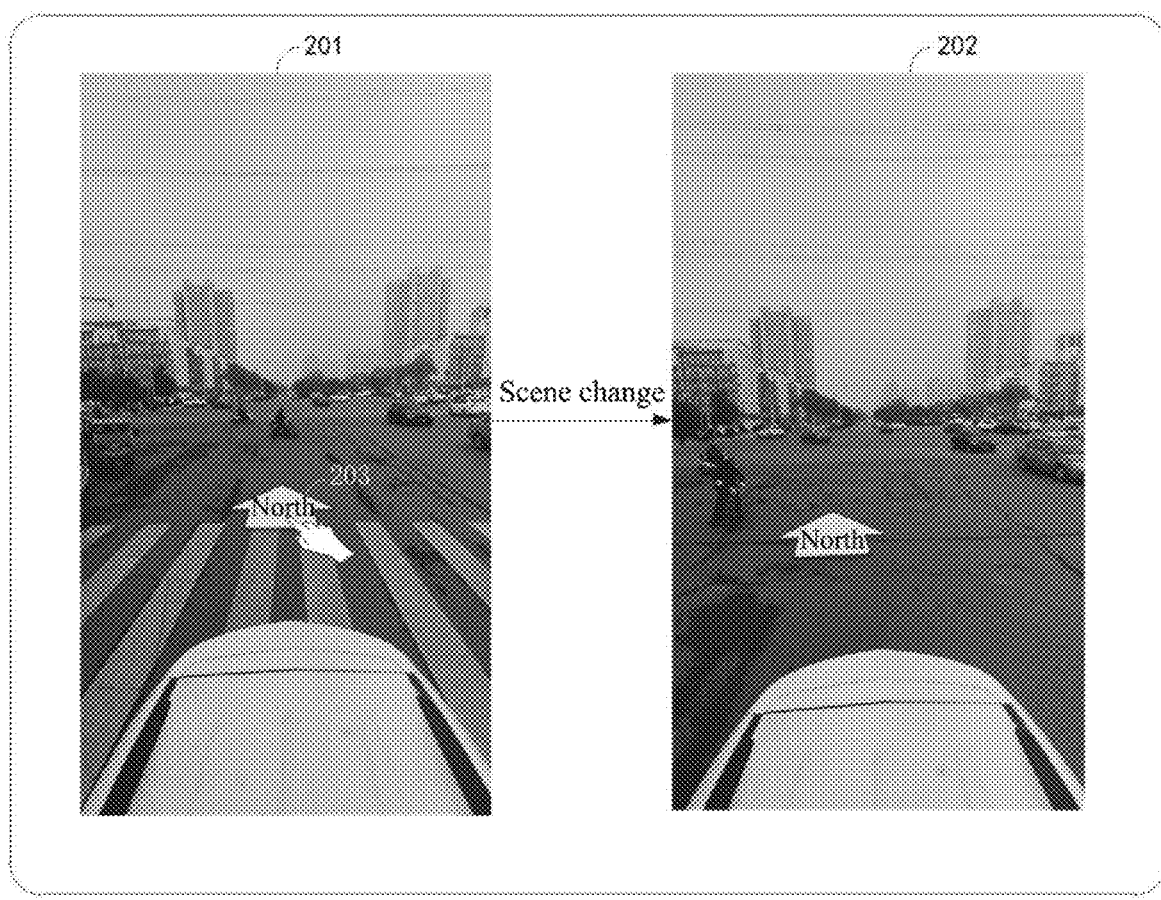
FIG. 2 is a schematic diagram of the implementation of a scene change provided by an embodiment of the present application.

In the panoramic display, the terminal device will provide the user with a display of multiple scenes in a certain location. These scenes can be, for example, continuous, thus a change of scenes is usually involved in a panoramic display. The implementation of a scene change can be introduced combined with FIG. 2 below. FIG. 2 is a schematic diagram of the implementation of a scene change provided by an embodiment of the present application.

As shown in FIG. 2, the method includes:

For example, the view angle displayed on the screen at the current moment is the view angle shown by 201 in FIG. 2. It can be seen that the view angle at the current moment is behind a zebra crossing. Assuming that a user clicks a control 203 in 201, a terminal device can perform a scene change in response to the click operation, where the function of the control 203 can be, for example, to move the view angle forward, and then the terminal device can display the scene in front of the scene of the current view angle according to the click operation, which for example, can be the scene shown by 202 in FIG. 2.

It can be determined by referring to 202 that the view angle in 202 is located behind the zebra crossing, compared to the view angle before the zebra crossing in 201, it is realized that the view angle is moved forward based on the user's operation, where the forward movement of the view angle can be understood, for example, as the behavior of the user walking forward in an actual scene. By realizing the forward movement in different directions according to the user's operation in the terminal device, the display of various scenes in a certain location can be realized.

At present, in the process of realizing a scene change, for example, one spherical model can be reused to perform the change of scenes. Specifically, the currently mapped panoramic picture in the spherical model is directly replaced with a next panoramic picture that needs to be displayed, so that a scene change based on reusing the spherical model is achieved.

For example, the prior art can be understood with reference to FIG. 2. For example, the scene shown by 202 in FIG. 2 is displayed at the current moment. When there is a need to perform a scene change, the picture in the spherical model is directly replaced with the picture of a next scene, thus the scene shown by 202 in FIG. 2 will be directly displayed. During the change process, it is a hard change based on a spherical model and two panoramic pictures without a transition effect, which will cause the performance of the scene change to be abrupt and lack vividness.

In another possible implementation, in the prior art, for example, a scene change can also be implemented based on two spherical models, that is to say, a picture of a current scene is mapped to a spherical model 1, and a picture of a next scene is mapped to a spherical model 2. When a scene change is performed, a mapping corresponding to the spherical model 1 is displayed at the current moment. According to a change operation, a mapping corresponding to the spherical model 2 is displayed at the next moment. However, a scene change based on two spherical models will cause more system resource consumption, and still lacks a transition effect.

In response to the problems in the prior art, the present application proposes the following technical idea: due to the issues on view angles in actual scenes, usually the change of the upper half of a scene is subtle, and it is mainly that the lower half changes, so a transition model can be constructed, where the transition model includes a first plane and a second plane, the first plane is parallel to a screen, and the second plane can change its angle. And then a scene change is performed based on the transition model, an image at the current moment is mapped to the transition model, and by gradually changing the angle of the second plane, a transition effect during a scene change is realized, and the vividness of a scene change is enhanced.

Figure 3:
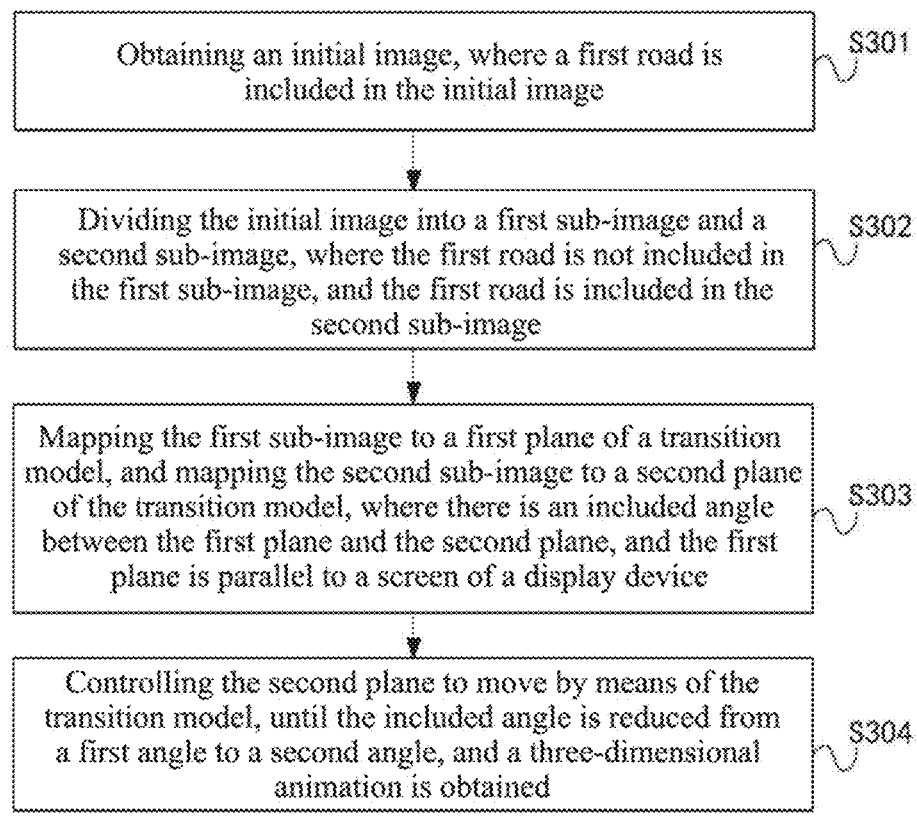
FIG. 3 is a flowchart of a map display method provided by an embodiment of the present application.

The map display method provided in the present application is described in combination with a specific embodiment below. FIG. 3 is a flowchart of the map display method provided in an embodiment of the present application.

As shown in FIG. 3, the method includes:

S301, obtaining an initial image, where a first road is included in the initial image.

In the present embodiment, the initial image may be, for example, the image currently displayed on the screen when there is a need to perform a scene change. For example, if a user clicks a switching control on the screen at moment a, the image displayed on the screen at the current moment a is taken as the initial image. The present embodiment does not limit what the initial image specifically is, and it depends on the display of the scene in the map and the generation moment of the change instruction.

It could be understood that, since a scene display in a map is usually implemented based on a picture taken on a road, the initial image in the present embodiment may include a first road, where the first road may be, for example, a lane, or may also be a sidewalk etc. The present embodiment does not limit the position, shape, size, type, etc. of the first road in the initial image, all of which can be implemented depending on the specific scene. The present embodiment does not particularly limit the specific implementation of the initial image and the first road.

S302, dividing the initial image into a first sub-image and a second sub-image, where the first road is not included in the first sub-image, and the first road is included in the second sub-image.

In the present embodiment, the division can be performed based on the obtained initial image, and the first sub-image and the second sub-image can be obtained. The function of dividing the initial image will be first described below:

It could be understood that whether people observe scenes in real life or a screen displays an image of a scene, from view angle, both meet the perspective principle. Here is an example in combination with a road. As the road extends, the road will gradually become smaller in the view angle until it disappears at a certain point. This point can be called as a vanishing point, and it is usually some scenes such as the sky and buildings above this vanishing point, and it is usually the road and a scene surrounding the road below this vanishing point.

And in the panoramic display, according to the user's change operation, a change from one scene to the next adjacent scene can be understood as simulating the operation of the user taking a step forward. In this process, the scene in the distance in the view angle generally does not change, and it is usually the near scene in the view angle that undergoes some changes. In the present embodiment, in order to facilitate to perform the subsequent transition effect processing, the initial image can be divided.

In combination with the scene where the initial image includes the first road in the present embodiment, the partial sub-image not including the first road is usually located in the upper half of the whole image, which does not change during the process of a scene change, or the changes are relatively subtle, and the partial sub-image including the first road is usually located in the lower half of the whole image, which will change during the process of a scene change. Therefore, in the present embodiment, the initial image can be divided into the first sub-image and the second sub-image.

In a possible implementation, for example, the initial image can be directly divided up and down from the middle, the upper half is determined as the first sub-image, and the lower half is determined as the second sub-image; or based on the vanishing point described above, a horizontal line can be determined according to the vanishing point, that above the horizontal line can be determined as the first sub-image, and that under the horizontal line can be determined as the second sub-image.

Alternatively, the first road can be identified based on the initial image, the part not including the first road is determined as the first sub-image, and the part including the first road is determined as the second sub-image. The present embodiment does not particularly limit the specific implementation of the division, as long as a first sub-image not including the first road and a second sub-image including the first road can be obtained by the division.

S303, mapping the first sub-image to a first plane of a transition model, and mapping the second sub-image to a second plane of the transition model, where there is an included angle between the first plane and the second plane, and the first plane is parallel to a screen of a display device.

In the present embodiment, the transition model is configured to implement the transition during the process of a scene change. In a possible implementation, the transition model may include a first plane and a second plane, where the first plane and the second plane can be, for example, connected, the first plane is parallel to the screen of the display device, and there is an included angle between the first plane and the second plane.

That is to say, the second plane has a certain angle relative to the screen of the display device, where the angle between the second plane and the first plane can also change, that is to say, the angle of the second plane can be adjusted, so as to achieve a transition effect.

Specifically, to achieve the transition effect based on the transition model, the current initial image that needs to achieve the transition effect is first needed to be mapped to the transition model. Based on the above introduction, it can be determined that the first sub-image is the part of the image that does not include the first road, that is, the part of the image that does not change or changes little, and the second sub-image is the part of the image that includes the first road, that is, the part of the image that will undergo an obvious change.

Therefore, in a possible implementation, the first sub-image can be mapped to the first plane of the transition model, so that the first sub-image remains parallel to the screen without change and the second sub-image is mapped to the second plane of the transition model, where the second plane will change, so the second sub-image can undergo corresponding change according to the second plane.

The present embodiment does not particularly limit the specific implementation of the mapping. For example, it may be a mode of orthogonal projection, or a pixel-by-pixel mapping mode, which can be selected according to actual needs, as long as it is can be achieved that the first sub-image is mapped to the first plane, and the second sub-image is mapped to the second plane.

S304, controlling the second plane to move by means of the transition model until the included angle is reduced from a first angle to a second angle, and a three-dimensional map display animation is obtained.

In the present embodiment, the angle of the second plane of the transition model can be changed. In the present embodiment, the second sub-image is mapped to the second plane, and when the angle of the second plane changes, the second sub-image will be carried to undergo corresponding change synchronously.

In a possible implementation, the change of the second plane in the transition model can be, for example, rotating around the boundary line of the first plane and the second plane. During the process of the rotation, the included angle between the first plane and the second plane can be reduced. Assuming that the included angle between the first plane and the second plane is the first angle in the initial situation, the second plane can be controlled to rotate, until the included angle is reduced from the first angle to the second angle.

It could be understood that the first plane is parallel to the screen, and the included angle between the second plane and the first plane being reduced indicates that the second plane is gradually raised up. During the process of the second plane being raised up, as the second plane is raised up, the second sub-image presents a process of deformation on the screen, thereby realizing a transition effect of the scene, thus realizing the display animation of the three-dimensional map. After the display animation of the three-dimensional map, the image of the scene to be switched can be displayed, so as to realize a change of the scene. In this process, due to the switching effect of the initial image, the abrupt switching effect caused by the direct image replacement can be avoided, and the vividness of a scene change can be effectively enhanced.

The map display method provided by the embodiment of the present application includes: obtaining an initial image, where a first road is included in the initial image. The initial image is divided into a first sub-image and a second sub-image, where the first road is not included in the first sub-image, and the first road is included in the second sub-image. The first sub-image is mapped to a first plane of a transition model, and the second sub-image is mapped to a second plane of the transition model, where there is an included angle between the first plane and the second plane, and the first plane is parallel to a screen of a display device. The second plane is controlled to move by means of the transition model, until the included angle is reduced from a first angle to a second angle, and a three-dimensional map display animation is obtained. By dividing the initial image that needs to achieve a transition effect into the first sub-image that does not include the first road and the second sub-image that includes the first road, then mapping the first sub-image to the first plane of the transition model, and mapping the second sub-image to the second plane of the transition model, and by controlling the second sub-image to change synchronously through rotating the angle of the second plane, the transition effect during the process of a scene change is thereby achieved and the vividness of the scene change is effectively enhanced.

Figure 4:
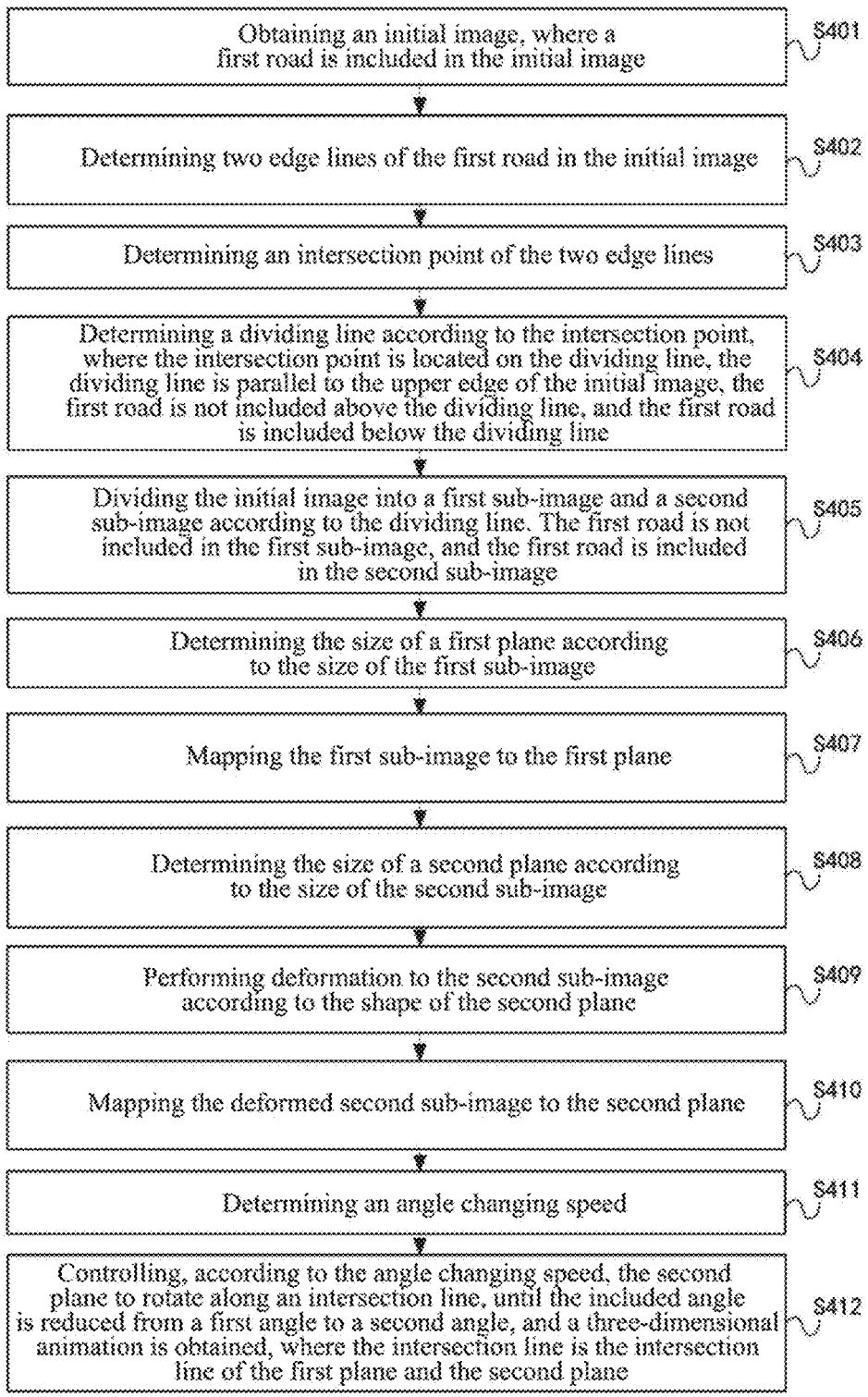
FIG. 4 is a flowchart two of a map display method provided by an embodiment of the present application.
Figure 5:
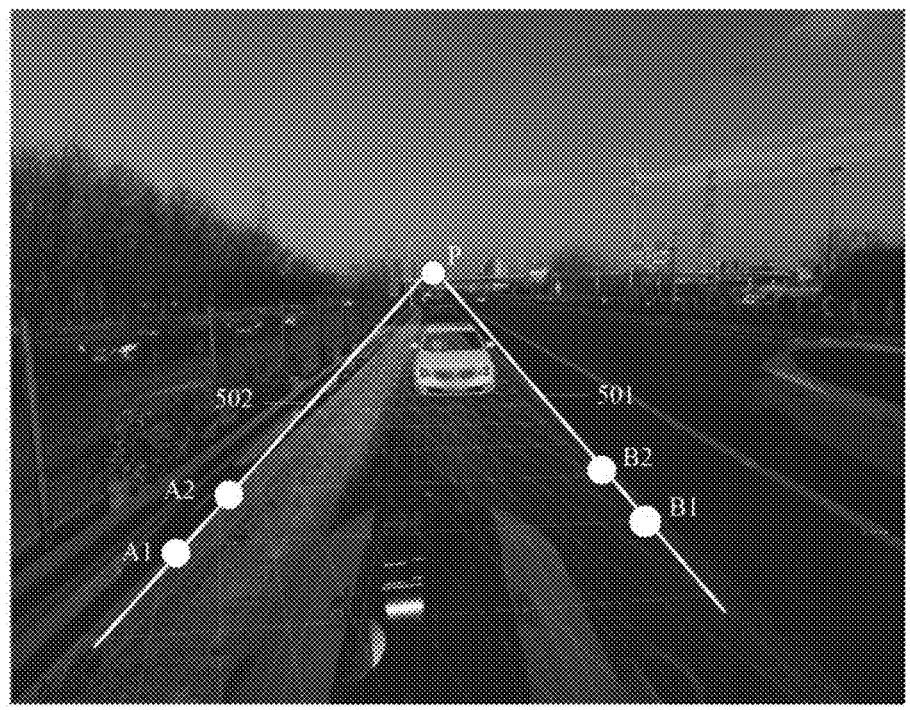
FIG. 5 is a schematic diagram of the implementation of determining edge points, edge lines and an intersection point provided by an embodiment of the present application.
Figure 6:
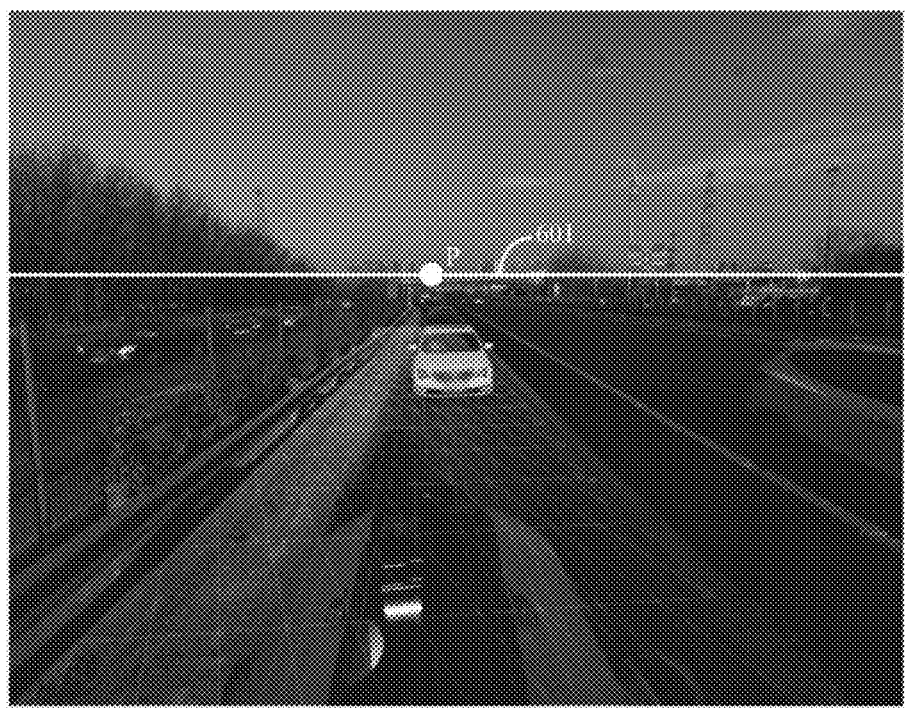
FIG. 6 is a schematic diagram of the implementation of determining a dividing line provided by an embodiment of the present application.
Figure 7:
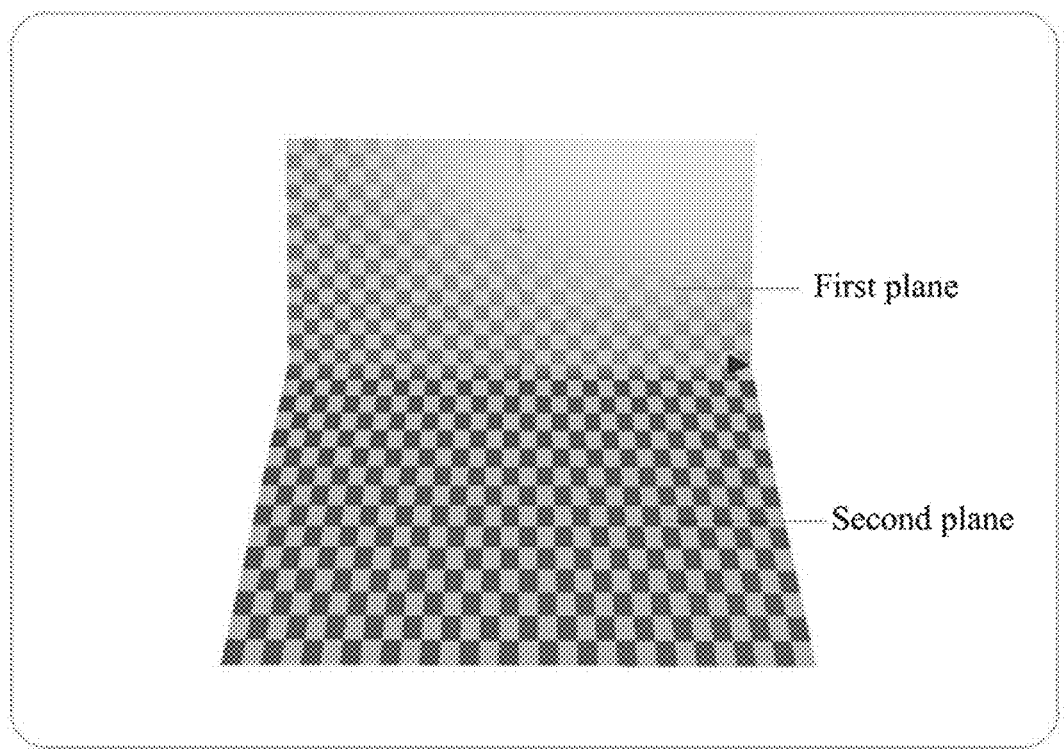
FIG. 7 is a schematic diagram of the front surface of a transition model provided by an embodiment of the present application.
Figure 8:
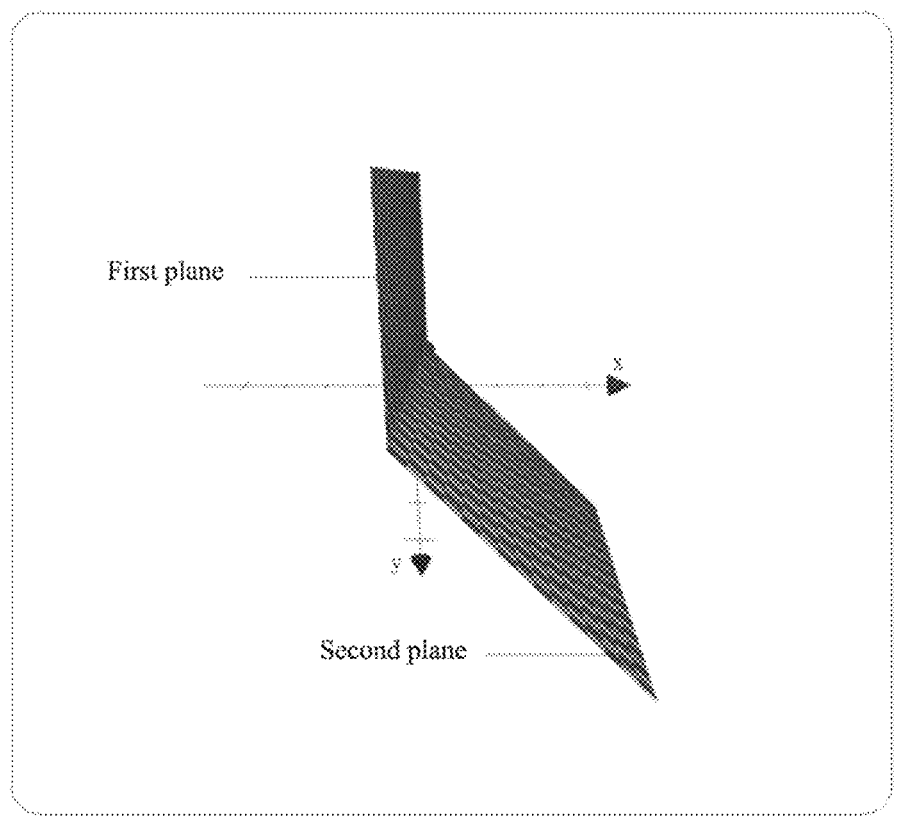
FIG. 8 is a schematic diagram of the side surface of a transition model provided by an embodiment of the present application.
Figure 9:
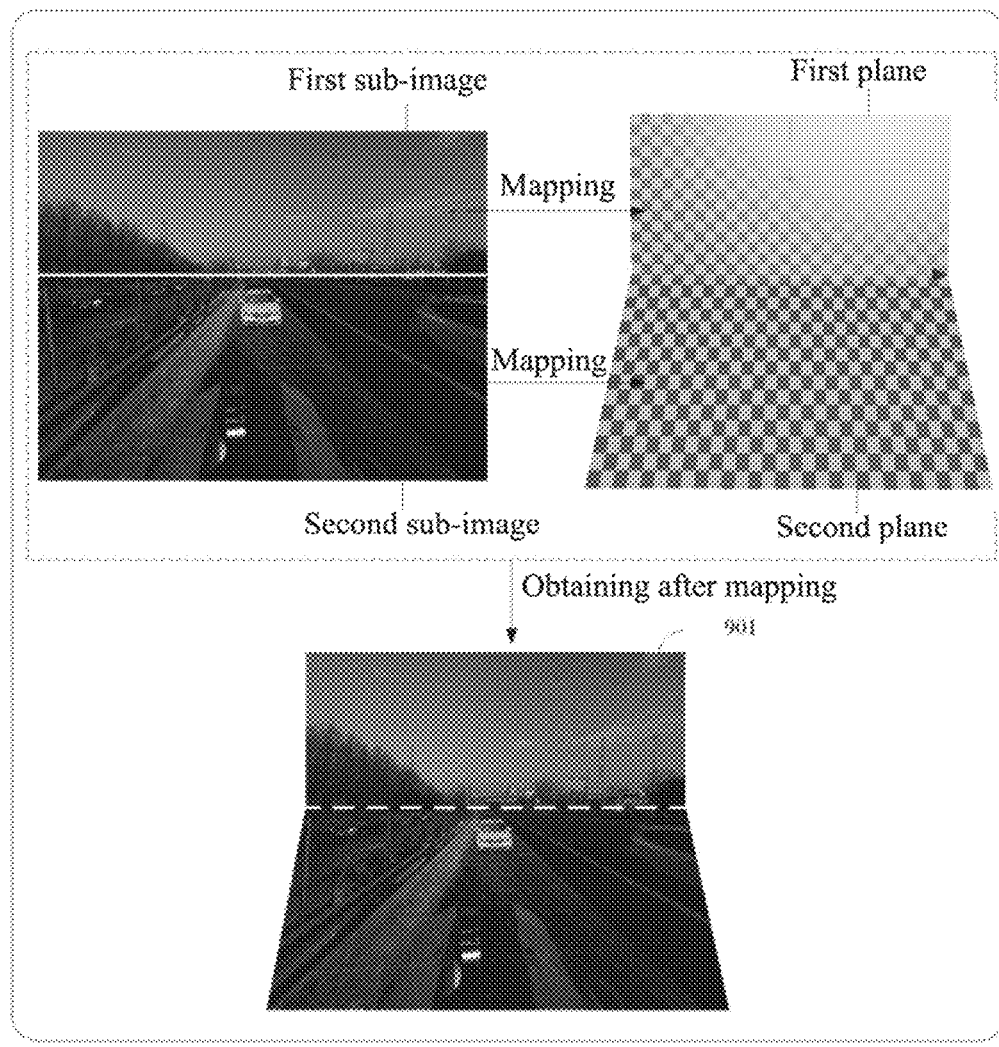
FIG. 9 is a schematic diagram of mapping a first sub-image and a second sub-image to a transition model provided by an embodiment of the present application.
Figure 10:
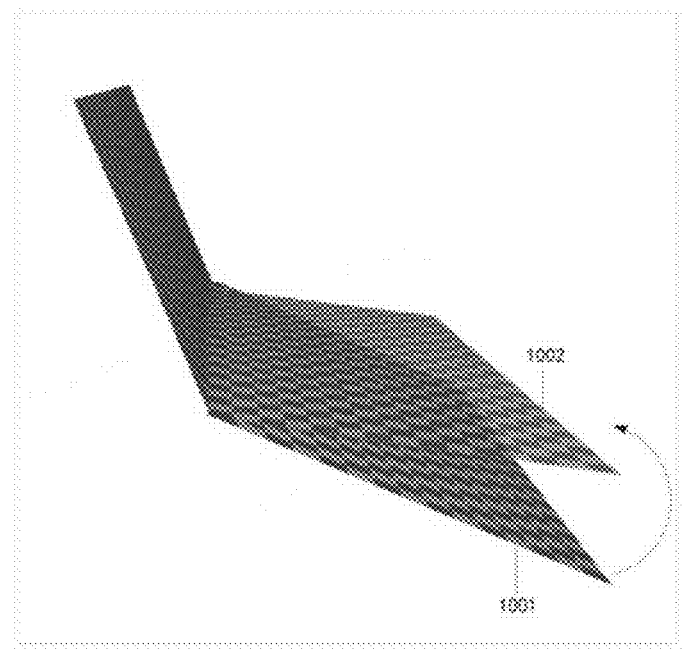
FIG. 10 is a schematic diagram of the rotation of a second plane of a transition model provided by an embodiment of the present application.
Figure 11:
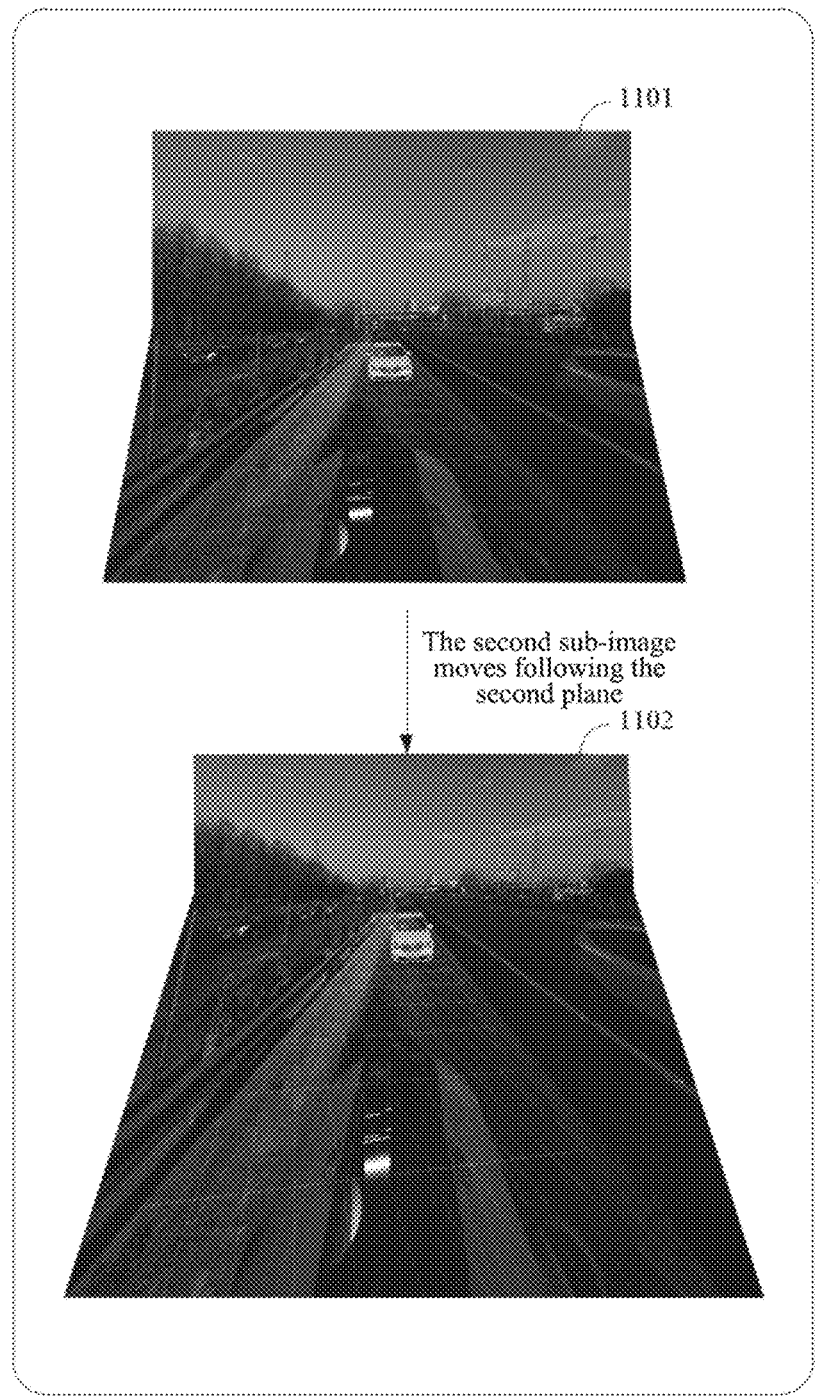
FIG. 11 is a schematic diagram of the implementation of the movement of a second sub-plane following a second plane provided by an embodiment of the present application.

On the basis of the above-mentioned embodiment, the map display method provided by the present application will be further described in detail below in conjunction with a specific embodiment and diagrams, which will be described with reference to FIG. 4 to FIG. 11. FIG. 4 is a flowchart two of the map display method provided by the embodiment according to the present application. FIG. 5 is a schematic diagram of the implementation of determining edge points, edge lines, and intersection points provided by an embodiment according to the present application. FIG. 6 is a schematic diagram of the implementation of determining a dividing line provided by an embodiment according to the present application. FIG. 7 is a schematic front surface of the transition model provided by an embodiment according to the present application. FIG. 8 is a schematic side surface of the transition model provided by an embodiment according to the present application. FIG. 9 is a schematic diagram of mapping the first sub-image and the second sub-image to the transition model provided by the embodiment according to the present application. FIG. 10 is a schematic diagram of rotation of the second plane of the transition model provided by an embodiment according to the present application. FIG. 11 is a schematic diagram of the implementation of the movement of the second sub-plane following the second plane provided by the embodiment according to the present application.

As shown in FIG. 4, the method includes:

S401, obtaining an initial image, where a first road is included in the initial image.

The implementation of S401 is similar to the implementation introduced in S301, and will not be repeated here.

S402, determining two edge lines of the first road in the initial image.

In the present embodiment, the initial image includes the first road. Because the initial image needs to be divided into a first sub-image and a second sub-image, where the first sub-image does not include the first road, and the second sub-image includes the first road, the two edge lines of the first road can be first determined in the initial image.

In a possible implementation, for example, the road width of the first road and a capturing parameter of a camera apparatus can be obtained, where the initial image is obtained by the capture of the camera apparatus. Then two groups of edge points are determined in the initial image according to the road width and the capturing parameter, where each group of edge points includes at least two edge points, and two edge lines are determined according to the two groups of edge points.

The road width of the first road may be, for example, collected during the process of capturing images by a collection car, and the capturing parameter of the camera apparatus may, for example, include information such as the angle, height, pixels, etc. of the camera apparatus. Then analysis on the initial image is performed according to the road width and the capturing parameter of the camera apparatus, and two groups of edge points can be determined in the initial image.

For example, one group of edge points can be determined respectively on both sides of the road, so that two group of edge points are determined, where each group of edge points includes at least two edge points, that is to say, at least two edge points can be respectively determined on both sides of the road.

For example, it can be introduced in conjunction with FIG. 5. It is assumed that the image shown in FIG. 5 is an initial image, there is a first road included in the initial image, and the first road is assumed to be the road corresponding to the grid in FIG. 5. At this time, according to the road width and the capturing parameter of the camera apparatus, edge point A1, edge point A2, edge point B1 and edge point B2 can be determined in the initial image, where A1 and A2 as a group of edge points can be understood as the edge points on the left side of the road, and B1 and B2 as a group of edge points can be understood as the edge points on the right side of the road.

In the actual implementation process, a group of edge points can also include, for example, 3, 4 or more edge points, and the positions of the edge points can also be selected according to actual needs, which is not limited by the present embodiment, as long as the edge points are located on the edge of the road, and each side of the road respectively includes at least two edge points.

After the two groups of edge points are determined, for example, at least two edge points of each group can be connected, then two edge lines can be determined. It could be understood that the two edge lines correspond to the edges on both sides of the road respectively. An edge point is a point located at an edge of the road.

S403, determining an intersection point of the two edge lines.

After the two edge lines are determined, the intersection point of the two edge lines can be determined. For example, it can be understood in conjunction with FIG. 5. It is assumed that currently based on the connection of a group of edge points A1 and A2, an edge line 502 on the left side of the road can be obtained, and based on the connection of another group of edge points B1 and B2, an edge line 502 on the right side of the road can be obtained.

After the edge line 501 and the edge line 502 are extended, there is an intersection point existed, that is, the intersection point P shown in FIG. 5, and the intersection point P can be understood as a vanishing point. It can be determined with reference to FIG. 5 that at the location of intersection point P, the road has disappeared, thus the intersection point P can also be understood as the point where the road disappears.

S404, determining a dividing line according to the intersection point, where the intersection point is located on the dividing line, and the dividing line is parallel to the upper edge of the initial image. The first road is not included above the dividing line, and the first road is included below the dividing line.

In the present embodiment, the initial image needs to be divided into a sub-image not including the first road and a sub-image including the first road. Since the first road disappears at the intersection point P, the dividing line of the initial image can be determined according to the intersection point P.

The intersection point P can be located on the dividing line, and the dividing line is parallel to the upper edge of the initial image. Since the road disappears at the position of the intersection point P, the first road is included below the dividing line and the first road is not included above the dividing line.

For example, it can be understood with reference to FIG. 6. Currently according to the intersection point P, a dividing line 601 parallel to the upper edge of the initial image is determined. The intersection point P is located on the dividing line 601. And it can be determined with reference to FIG. 6 that the first road is not included above the dividing line 601, and the first road is included below the dividing line.

S405, dividing the initial image into a first sub-image and a second sub-image according to the dividing line, where the first road is not included in the first sub-image, and the first road is included in the second sub-image.

The dividing line in the present embodiment can separate the part that includes the first road from the part that does not include the first road. Therefore, the initial image can be divided into the first sub-image and the second sub-image according to the dividing line. For example, that above the dividing line is determined as the first sub-image, where the first road is not included in the first sub-image, and that below the dividing line is determined as the second sub-image, where the first road is included in the second sub-image.

S406, determining the size of a first plane according to the size of the first sub-image.

After the division of the first sub-image and the second sub-image is realized, it is needed to map the first sub-image to a first plane of a transition model and to map the second sub-image to a second plane of the transition model. Firstly, the implementation of the transition model will be introduced in conjunction with FIG. 7 and FIG. 8.

FIG. 7 is the front surface of the transition model, and FIG. 8 is the side surface of the transition model. It can be seen by combining FIG. 7 and FIG. 8 that the first plane and the second plane of the transition model are connected, where the first plane remains parallel to a screen of a display device, and there is an included angle between the first plane and the second plane, thus the second plane is at an certain angle to the screen.

For example, FIG. 8 can be referred, where the x direction is the direction perpendicular to the screen, and the y direction is the direction parallel to the screen. Therefore, based on FIG. 8, the relationship between the first plane and the second plane, as well as the relationship with the screen can be determined more intuitively.

Based on the transition model introduced above, in the present embodiment, the first sub-image needs to be mapped to the first plane of the transition model. Because the size of the first sub-image and the size of the first plane may not be consistent, for example, the sub-image is a rectangular, and the first plane is a square, then good mapping cannot be achieved. In order to ensure that the first sub-image can be successfully mapped to the first plane, the size of the first plane can be determined according to the size of the first sub-image.

In a possible implementation, for example, the size of the first plane can be adjusted to be the same as the size of the first sub-image; or, the size of the first plane can also be adjusted to be proportional to the size of the first sub-image. The present embodiment does not particularly limit the specific implementation of adjusting the size. It can be selected according to actual needs, as long as the size of the first plane is determined according to the size of the first sub-image, and the mapping of the first sub-image can be guaranteed.

S407, mapping the first sub-image to the first plane.

In the present embodiment, the first sub-image does not include the first road. Based on the above introduction and illustration, it can be determined that the first sub-image is actually the part above the dividing line. This part of image will not change during the scene change process, or the changes are very subtle, thus the first sub-image can be mapped to the first plane, as long as the display of the first sub-image is maintained.

For example, it can be understood in conjunction with FIG. 9 that the first sub-image is mapped to the first plane. With reference to FIG. 9, the first sub-image currently can be mapped to the first plane, for example, by means of orthogonal projection, and the effect shown above the dotted line of

901 in FIG. 9 can be obtained. It can be seen that the display of the first sub-image has not changed much.

S408, determining the size of the second plane according to the size of the second sub-image.

The implementation of determining the size of the second plane is similar to the implementation of determining the size of the first plane described above, and will not be repeated here.

S409, performing deformation to the second sub-image according to the shape of the second plane.

After the size of the second plane is determined, since the second plane is at a certain angle to the screen, the second plane can be, for example, a trapezoid as shown in FIG. 9. However, the second sub-image is rectangular. Therefore, in order to map the second sub-image to the second plane, the second sub-image needs to be performed deformation to ensure that the second sub-image can be mapped to the second plane.

S410, mapping the deformed second sub-image to the second plane.

In the present embodiment, the second sub-image is the part that includes the first road. Based on the above introduction and illustration, it can be determined that the second sub-image is actually the part below the dividing line. This part of the image needs to change during the scene change process to present a transition effect, and since the second plane can be rotated, the second sub-image can be mapped to the second plane, so as to archive that the second sub-image can move synchronously following the rotation of the second plane.

For example, it can be understood in conjunction with FIG. 9 that the second sub-image is mapped to the second plane. With reference to FIG. 9, the second sub-image currently can be mapped to the second plane, for example, by means of orthogonal projection, and the effect shown below the dotted line of 901 in FIG. 9 is obtained. It can be seen that the display of the second sub-image has undergone an obvious deformation.

After the mapping is completed, the second sub-image can follow the movement of the second plane and undergoes a corresponding change.

S411, determining an angle changing speed.

In the present embodiment, the second plane needs to be controlled to move to achieve a corresponding transition effect. For example, the second plane can be controlled to rotate around the junction of the first plane and the second plane. During the process of the rotation, the included angle of the first plane and the second plane will change, where the angle changing speed will affect the presentation of the transition effect, thus it is necessary to determine the angle changing speed.

When the transition effect is needed to be faster, the angle changing speed can be controlled to be faster. When the transition effect is needed to be slower, the angle changing speed can be controlled to be slower. In the actual implementation process, the specific angle changing speed can be selected according to actual needs, which is not particularly limited by the present embodiment.

S412, controlling, according to the angle changing speed, the second plane to rotate along an intersection line, until the included angle is reduced from a first angle to a second angle, and a three-dimensional animation is obtained, where the intersection line is the intersection line of the first plane and the second plane.

After that, according to the determined angle changing speed, the second plane is controlled to rotate along the intersection line of the first plane and the second plane. For example, it can be understood with reference to FIG. 10. With reference to FIG. 10, the second plane rotates around the intersection line, for example, rotates from the position of 1001 to the position of 1002. Assuming that the included angle between the first plane and the second plane is the first angle in an initial situation, when it is rotated to the second angle, it can be determined that the change of the second plane is completed.

During this process, since there is the second sub-image mapped on the second plane, the second sub-image will present a shuttle effect as the second plane rotates, which, for example, can be understood in conjunction with FIG. 11.

With reference to FIG. 11, 1101 is the effect when the first sub-image and the second sub-image are just mapped to the transition model. As the angle of the second plane of the transition model changes, the second sub-image will change accordingly, and presents a transition effect shown by 1102 in FIG. 11, where 1102 is the effect at a certain moment in the transition process.

And, the method provided in the present embodiment may further include:

In the process of the second plane is controlled to move by the transition model, the transition model is controlled to present a fading effect. When the included angle is reduced to the second angle, the transition model is not displayed, and the switched next image frame is displayed through the spherical model.

When the included angle is reduced to the second angle, the transition model disappears from the screen under the action of the fading effect. The image of the next scene is mapped in the spherical model. In the process of the transition model fading, the spherical model of the next scene gradually appears. When the transition model disappears completely, a scene change is realized. In the process of the scene change, the forward transition effect is realized based on the transition model, thereby the vividness of scene change can be effectively enhanced.

It should be noted here that the initial image is the image displayed on the screen when the scene change instruction is received. Under normal circumstances, the image is rendered in the spherical model. In the present embodiment, during the scene change, the initial image rendered in the spherical model at the current moment is used as the texture of the transition model and mapped to the transition model, that is to say, the transition model is used to replace the spherical model. However, since what displayed are all the initial images, a user cannot perceive the replacement of the models, thereby the transition effect of the scene can be effectively realized without the user's perception.

According to the method provided by the embodiments of the present application, the intersection point is determined according to the edge lines of the first road in the initial image, and the dividing line is determined according to the intersection point, where the determined dividing line can ensure to be the line on which the point where the first road disappears in the initial image is located. Therefore, dividing the initial image according to the dividing line can ensure that the first sub-image above the dividing line does not include the first road, and the second sub-image below the dividing line includes the second road. Therefore, the first sub-image and the second sub-image determined based on the above-mentioned method in the present application can effectively guarantee the correctness of the division, thereby the rationality of the subsequent transition effect can be guaranteed, and in the present application, the effect of scene change can be effectively realized based on the transition model and the mapping of the first sub-image and the second sub-image, thus the vividness of scene change can be effectively enhanced.

And in this process, the image frame at the transition moment is replaced from the spherical model to the transition model to achieve the transition effect. Compared to the scene change based on two spherical models, since the mapping of the transition model in the present application requires less amount of work, system overhead can be effectively saved, and the transition effect can be effectively achieved.

The present application provides a map display method and apparatus, which are applied in the field of computer vision in the image processing technology, so as to achieve the object of improving the vividness of scene change.

Figure 12:
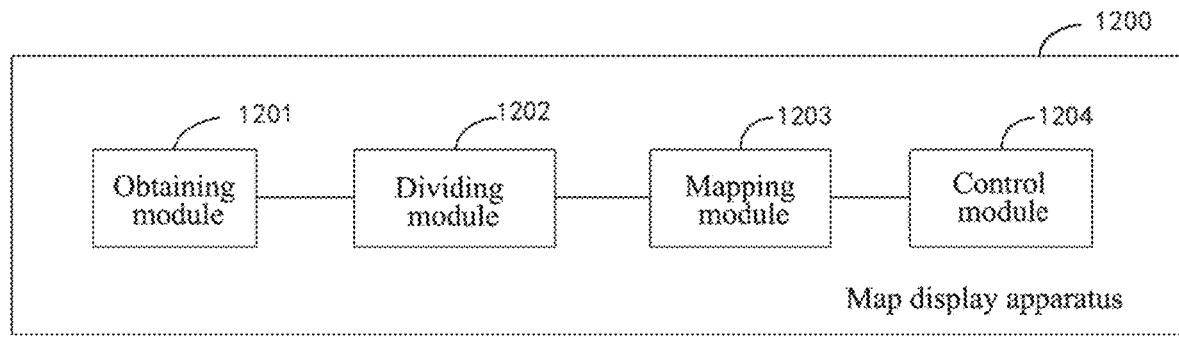
FIG. 12 is a structure schematic diagram of a map display apparatus according to an embodiment of the present application.

FIG. 12 is a schematic structural diagram of a map display apparatus according to an embodiment of the present application. As shown in FIG. 12, the map display apparatus 1200 of the present embodiment may include: an obtaining module 1201, a dividing module 1202, a mapping module 1203 and a control module 1204.

The obtaining module 1201 is configured to obtain an initial image, where a first road is included in the initial image.

The dividing module 1202 is configured to divide the initial image into a first sub-image and a second sub-image, where the first road is not included in the first sub-image, and the first road is included in the second sub-image.

The mapping module 1203 is configured to map the first sub-image to a first plane of a transition model, and to map the second sub-image to a second plane of the transition model, where there is an included angle between the first plane and the second plane, and the first plane is parallel to a screen of a display device.

The control module 1204 is configured to control the second plane to move by means of the transition model, until the included angle is reduced from a first angle to a second angle, and a three-dimensional map display animation is obtained.

In a possible implementation, the mapping module 1203 includes:
a first determining unit, configured to determine the size of the first plane according to the size of the first sub-image; and
a first mapping unit, configured to map the first sub-image to the first plane.

In a possible implementation, the mapping module 1203 includes:
a second determining unit, configured to determine the size of the second plane according to the size of the second sub-image;
a changing unit, configured to perform deformation to the second sub-image according to the shape of the second plane; and
a second mapping unit, configure to map the deformed second sub-image to the second plane.

In a possible implementation, the control module 1204 includes:
a third determining unit, configured to determine an angle changing speed; and
a control unit, configured to control, according to the angle changing speed, the second plane to rotate along an intersection line, until the included angle is reduced from the first angle to the second angle, and a three-dimensional map display animation is obtained, where the intersection line is the intersection line of the first plane and the second plane.

In a possible implementation, the dividing module 1202 includes:
a fourth determining unit, configured to determine two edge lines of the first road in the initial image;
where the fourth determining unit is further configured to determine a dividing line in the initial image according to the two edge lines, where the first road is not included above the dividing line, and the first road is included below the dividing line; and
a dividing unit, configured to divide the initial image into the first sub-image and the second sub-image according to the dividing line.

In a possible implementation, the fourth determining unit is specifically configured to:
determine an intersection point of the two edge lines; and
determine the dividing line according to the intersection point, where the intersection point is located on the dividing line, and the dividing line is parallel to the upper edge of the initial image.

In a possible implementation, the fourth determining unit is specifically configured to:
obtain the road width of the first road, and a capturing parameter of a camera apparatus, where the initial image is obtained by capture of the camera apparatus;
determine two groups of edge points in the initial image according to the road width and the capturing parameter, where each group of the edge points includes at least two edge points; and
determine the two edge lines according to the two groups of edge points.

In a possible implementation, the control module 1204 is further configured to:
control the transition model to present a fading effect during the process of the transition model controlling the second plane to move, where when the included angle is reduced to the second angle, the transition model does not display, and a switched next image is displayed through the spherical model.

According to embodiments of the present application, the present application also provides an electronic device and a readable storage medium.

According to an embodiment of the present application, the present application also provides an computer program product, where the program product includes: a computer program, where the computer program is stored in a readable storage medium, at least one processor of an electronic device can read the computer program from the readable storage medium, and the at least one processor performs the computer program to enable the electronic device to execute the solution provided by any embodiment above-described.

Figure 13:
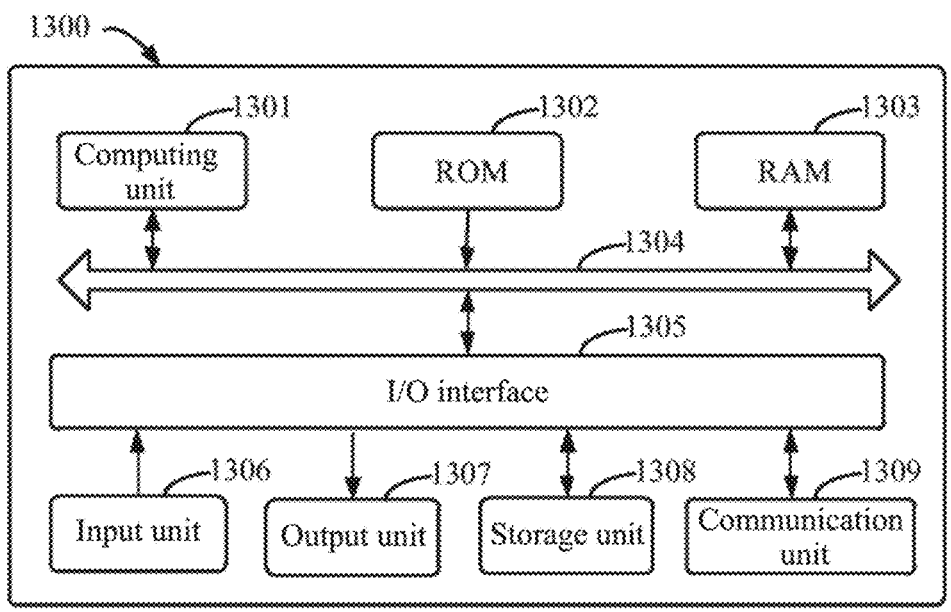
FIG. 13 is a block diagram of an electronic device configured to implement a map display method according to an embodiment of the present application.

FIG. 13 depicts a schematic block diagram of an exemplary electronic device 1300 that can be used to implement an embodiment of the present application. The electronic device is intended to represent various forms of digital computers, such as a laptop computer, a desktop computer, a workstation, a personal digital assistant, a server, a blade server, a mainframe computer, and other suitable computers. The electronic device can also represent various forms of mobile devices, such as a personal digital processing, a cellular phone, a smart phone, a wearable device and other similar computing apparatus. The components shown herein as well as their connections and relationships and their functions are merely examples, and are not intended to limit the implementation of the present disclosure described and/or claimed herein.

As shown in FIG. 13, the electronic device 1300 includes a computing unit 1301, which can execute various appropriate action and process, according to a computer program stored in a read-only medium (ROM) 1302 or a computer program loaded from a storage unit 1308 into a random access memory (RAM) 1303. In the RAM 1303, various programs and data required for the operation of the device 1300 can also be stored. The computing unit 1301, the ROM 1302 and the RAM 1303 are connected to each other through a bus 1304. The input/output (I/O) interface 1305 is also connected to the bus 1304.

Multiple components in the device 1300 are connected to the I/O interface 1305, including: an input unit 1306, such as a keyboard, a mouse, etc.; an output unit 1307, such as various types of displays, speakers, etc.; a storage unit 1308, such as a disk, an optical disk, etc.; and a communication unit 1309, such as a network card, a modem, a wireless communication transceiver, etc. The communication unit 1309 allows the device 1300 to exchange information/data with other devices through a computer network such as the Internet and/or various telecommunication networks.

The computing unit 1301 may be various general-purpose and/or special-purpose processing components with processing and computing capabilities. Some examples of computing unit 1301 include, but are not limited to, central processing unit (CPU), graphics processing unit (GPU), various dedicated artificial intelligence (AI) computing chips, various computing units that run machine learning model algorithms, digital signal processor (DSP), and any appropriate processor, controller, microcontroller, etc. The computing unit 1301 executes the various methods and processing described above, such as a map display method. For example, in some embodiments, the map display method may be implemented as a computer software program, which is tangibly contained in a machine-readable medium, such as the storage unit 1308. In some embodiments, part or all of the computer program may be loaded and/or installed on the device 1300 via the ROM 1302 and/or the communication unit 1309. When the computer program is loaded into the RAM 1303 and executed by the computing unit 1301, one or more steps of the map display method described above can be executed. Alternatively, in other embodiments, the computing unit 1301 may be configured to execute the map display method in any other suitable manner (for example, by means of firmware).

The various embodiments of the systems and techniques described herein may be implemented in digital electronic circuit systems, integrated circuit systems, field programmable gate array (FPGA), application specific integrated circuit (ASIC), dedicated standard products (ASSP), system on chip (SOC), load programmable logic device (CPLD), computer hardware, firmware, software, and/or combinations thereof. These various implementations may include: being implemented in one or more computer programs that can be executed and/or interpreted on a programmable system including at least one programmable processor. The programmable processor may be a special or general programmable processor, and can receive data and instructions from a storage system, at least one input apparatus and at least one output apparatus, and transmit data and instructions to the storage system, the at least one input apparatus and the at least one output apparatus.

The program codes used to implement the method of the present disclosure can be written in any combination of one or more programming languages. These program codes can be provided to the processors or controllers of general-purpose computers, special-purpose computers, or other programmable data processing devices, so that when the program codes are executed by the processors or controllers, the functions/the operation specified in the flowcharts and/or the block diagrams are implemented. The program codes can be executed entirely on a machine, partly on a machine, as an independent software package, partly executed on a machine and partly executed on a remote machine, or entirely executed on a remote machine or server.

In the context of the present disclosure, a machine-readable medium may be a tangible medium, which may contain or store a program for the instruction execution system, apparatus, or device to use or to be used in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, device, or device, or any suitable combination of the foregoing. More specific examples of machine-readable storage medium would include electrical connections based on one or more wires, portable computer disks, hard disks, random access memory (RAM), read-only memory (ROM), erasable programmable read-only memory (EPROM or flash memory), optical fiber, compact disk read-only memory (CD-ROM), optical storage device, magnetic storage device, or any suitable combination of the above content.

To provide interaction with users, the systems and techniques described herein can be implemented on a computer which has: a display device (e.g., a CRT (cathode ray tube) or LCD (liquid crystal display) monitor) for displaying information to users; as well as a keyboard and a pointing apparatus (e.g., a mouse or a trackball) through which users can provide inputs to the computer. Other kinds of apparatuses can also be used to provide interaction with users, for example, a feedback provided to a user can be any form of sensory feedback (e.g., visual feedback, auditory feedback, or tactile feedback); and can receive inputs from users in any form (including acoustic input, voice input or tactile input).

The systems and techniques described herein can be implemented in a computing system including background components (e.g., as a data server), or a computing system including middleware components (e.g., an application server), or a computing system including front-end components (e.g., a user computer with a graphical user interface or a web browser through which users can interact with implementations of the systems and techniques described herein), or a computing system including any combination of such background components, middleware components or front-end components. Components of the system can be connected to each other through digital data communication in any form or medium (e.g., a communication network). Examples of the communication network include: a local area networks (LAN), a wide area network (WAN) and the Internet.

A computer system may include a client and a server. The client and server are generally remote from each other and usually interact through a communication network. A relationship between the client and the server is generated by computer programs running on corresponding computers and having a client-server relationship with each other. The server can be a cloud server, which is also known as a cloud computing server or a cloud host. It is a host product in the cloud computing service system to solve the defects existing in traditional physical host and VPS service ("Virtual Private Server", or "VPS" for short) of huge management difficulty and weak business scalability. The server can also be a server of a distributed system, or a server combined with a blockchain.

It should be understood that steps can be reordered, added or deleted using the various forms of processes shown above. For example, the steps described in the present application can be executed in parallel, sequentially or in a different order, so long as the desired result of the technical solution disclosed in the present application can be achieved, which is not limited herein.

The above specific implementations do not constitute a limitation to the protection scope of the present application. It should be understood by those skilled in the art that various modifications, combinations, sub-combinations, and substitutions may be performed according to design requirements and other factors. Any modification, equivalent substitution, improvement and others that are made within the spirit and principle of the present application shall be included in the protection scope of the present application.

What is claimed is:

1. A map display method, comprising:
    obtaining an initial image, wherein a first road is comprised in the initial image;
    dividing the initial image into a first sub-image and a second sub-image, wherein the first road is not comprised in the first sub-image, and the first road is comprised in the second sub-image;
    mapping the first sub-image to a first plane of a transition model, and mapping the second sub-image to a second plane of the transition model, wherein there is a included angle between the first plane and the second plane, and the first plane is parallel to a screen of a display device; and
    controlling the second plane to move by means of the transition model, until the included angle is reduced from a first angle to a second angle, and a three-dimensional map display animation is obtained.

2. The method according to claim 1, wherein the mapping the first sub-image to the first plane of the transition model comprises:
    determining the size of the first plane according to the size of the first sub-image; and
    mapping the first sub-image to the first plane.

3. The method according to claim 1, wherein the mapping the second sub-image to the second plane of the transition model comprises:
    determining the size of the second plane according to the size of the second sub-image;
    performing deformation to the second sub-image according to the shape of the second plane; and
    mapping the deformed second sub-image to the second plane.

4. The method according to claim 1, wherein the controlling the second plane to move by means of the transition model, until the included angle is reduced from the first angle to the second angle, and the three-dimensional map display animation is obtained comprises:
    determining an angle changing speed; and
    controlling, according to the angle changing speed, the second plane to rotate along an intersection line, until the included angle is reduced from the first angle to the second angle, and a three-dimensional map display animation is obtained; wherein the intersection line is the intersection line of the first plane and the second plane.

5. The method according to claim 1, wherein the dividing the initial image to the first sub-image and the second sub-image comprises:
    determining two edge lines of the first road in the initial image;
    determining a dividing line in the initial image according to the two edge lines, wherein the first road is not comprised above the dividing line, and the first road is comprised below the dividing line; and
    dividing the initial image into the first sub-image and the second sub-image according to the dividing line.

6. The method according to claim 5, wherein the determining the dividing line in the initial image according to the two edge lines comprises:
    determining an intersection point of the two edge lines; and
    determining the dividing line according to the intersection point, wherein the intersection point is located on the dividing line, and the dividing line is parallel to the upper edge of the initial image.

7. The method according to claim 5, wherein the determining the two edge lines of the first road in the initial image comprises:
    obtaining a road width of the first road, and a capturing parameter of a camera apparatus, wherein the initial image is obtained by capture of the camera apparatus;
    determining two groups of edge points in the initial image according to the road width and the capturing parameter, wherein each group of edge points comprises at least two edge points; and
    determining the two edge lines according to the two group of edge points.

8. The method according to claim 1, further comprising:
    controlling the transition model to present a fading effect during the process of controlling the second plane to move by means of the transition model, wherein when the included angle is reduced to the second angle, the transition model does not display, and a switched next image is displayed through a spherical model.

9. An electronic device, comprising: at least one processor and a memory communicatively connected to the at least one processor; wherein the memory stores instructions executable by the at least one processor, and the at least one processor, when executing the instructions, is configured to:
    obtain an initial image, wherein a first road is comprised in the initial image;
    divide the initial image into a first sub-image and a second sub-image, wherein the first road is not comprised in the first sub-image, and the first road is comprised in the second sub-image;
    map the first sub-image to a first plane of a transition model, and map the second sub-image to a second plane of the transition model, wherein there is an included angle between the first plane and the second plane, and the first plane is parallel to a screen of a display device; and
    control the second plane to move by means of the transition model, until the included angle is reduced from a first angle to a second angle, and a three-dimensional map display animation is obtained.

10. The electronic device according to claim 9, wherein the at least one processer is configured to:
    determine the size of the first plane according to the size of the first sub-image; and
    map the first sub-image to the first plane.

11. The electronic device according to claim 9, wherein the at least one processor is configured to:
    determine the size of the second plane according to the size of the second sub-image;
    perform deformation to the second plane according to the shape of the second sub-image; and
    map the deformed second sub-image to the second plane.

12. The electronic device according to claim 9, wherein the at least one processor is configured to:
    determine an angle changing speed; and
    control, according to the angle changing speed, the second plane to rotate along an intersection line, until the included angle is reduced from the first angle to the second angle, and a three-dimensional map display animation is obtained, wherein the intersection line is the intersection line of the first plane and the second plane.

13. The electronic device according to claim 9, wherein the at least one processor is configured to:
    determine two edge lines of the first road in the initial image;
    wherein the at least one processor is further configured to determine a dividing line in the initial image according to the two edge lines, wherein the first road is not comprised above the dividing line, and the first road is comprised below the dividing line; and
    divide the initial image into the first sub-image and the second sub-image according to the dividing line.

14. The electronic device according to claim 13, wherein the at least one processor is specifically configured to:
    determine an intersection point of the two edge lines; and
    determine the dividing line according to the intersection point, wherein the intersection point is located on the dividing line, and the dividing line is parallel to the upper edge of the initial image.

15. The electronic device according to claim 13, wherein the at least one processor is specifically configured to:
    obtain a road width of the first road, and a capturing parameter of a camera apparatus, wherein the initial image is obtained by capture of the camera apparatus;
    determine two groups of edge points in the initial image according to the road width and the capturing parameter, wherein each group of the edge points comprises at least two edge points; and
    determine the two edge lines according to the two groups of edge points.

16. The electronic device according to claim 9, wherein the at least one processor is further configured to:
    control the transition model to present a fading effect during the process of controlling the second plane to move by means of the transition model, wherein when the included angle is reduced to the second angle, the transition model does not display, and a switched next image is displayed through the spherical model.

17. A non-transitory computer-readable storage medium, having computer instructions stored thereon, wherein the computer instructions are used to enable a computer to:
    obtain an initial image, wherein a first road is comprised in the initial image;
    divide the initial image into a first sub-image and a second sub-image, wherein the first road is not comprised in the first sub-image, and the first road is comprised in the second sub-image;
    map the first sub-image to a first plane of a transition model, and mapping the second sub-image to a second plane of the transition model, wherein there is a included angle between the first plane and the second plane, and the first plane is parallel to a screen of a display device; and
    control the second plane to move by means of the transition model, until the included angle is reduced from a first angle to a second angle, and a three-dimensional map display animation is obtained.

18. The storage medium according to claim 17, wherein the computer instructions are further used to enable the computer to:
    determine the size of the first plane according to the size of the first sub-image; and
    map the first sub-image to the first plane.

19. The storage medium according to claim 17, wherein the computer instructions are further used to enable the computer to:
    determine the size of the second plane according to the size of the second sub-image;
    perform deformation to the second sub-image according to the shape of the second plane; and
    map the deformed second sub-image to the second plane.

20. The storage medium according to claim 17, wherein the computer instructions are further used to enable the computer to:
    determine an angle changing speed; and
    control, according to the angle changing speed, the second plane to rotate along an intersection line, until the included angle is reduced from the first angle to the second angle, and a three-dimensional map display animation is obtained; wherein the intersection line is the intersection line of the first plane and the second plane.

* * * * *